P. EMDEN.
VALVE GEAR.
APPLICATION FILED FEB. 16, 1918.
1,304,286.
Patented May 20, 1919.
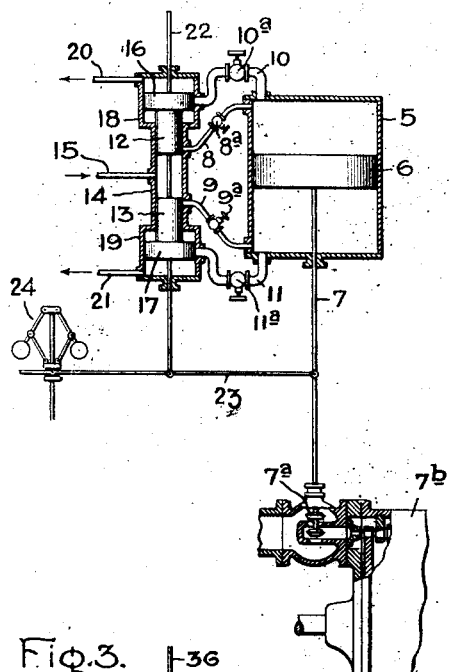
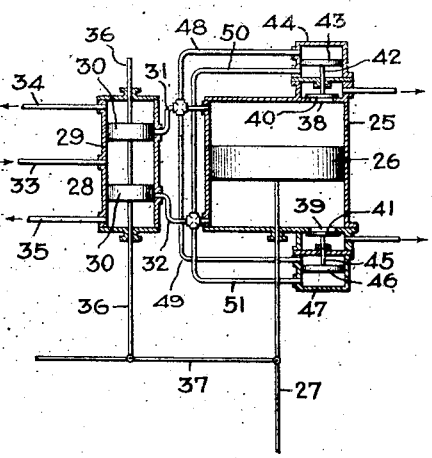
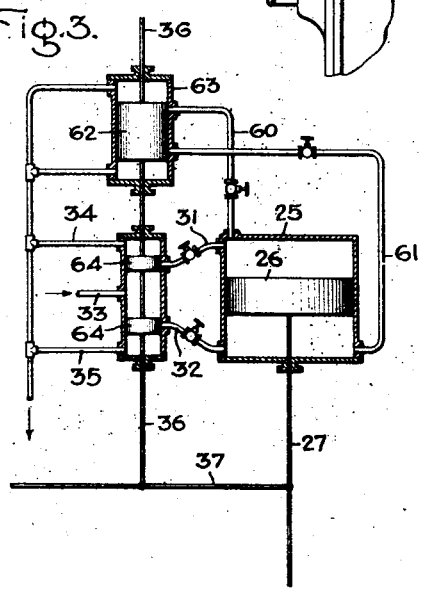
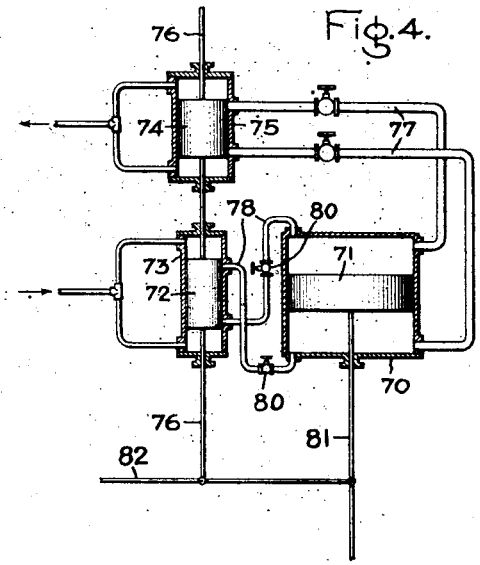
Inventor:
Paul Emden,
by Albert G. Davis
His Attorney.

UNITED STATES PATENT OFFICE.

PAUL EMDEN, OF BERLIN, GERMANY, ASSIGNOR TO GENERAL ELECTRIC COMPANY, A CORPORATION OF NEW YORK.

VALVE-GEAR.

1,304,286.  Specification of Letters Patent.  Patented May 20, 1919.

Application filed February 16, 1916. Serial No. 78,621.

*To all whom it may concern:*

Be it known that I, PAUL EMDEN, a citizen of the Swiss Republic, residing at Berlin, Germany, have invented certain new and useful Improvements in Valve-Gears, of which the following is a specification.

The present invention relates to fluid actuated valve gears such as are used, for example, in regulating the valves which control the admission of motive fluid to prime movers. Valve gears of the type to which my invention relates comprise a piston moving in a cylinder and connected with the valve mechanism of the prime mover, and a pilot valve operated by a speed governor which is moved to control the admission of actuating fluid to and from the cylinder on opposite sides of the piston. As is well understood, the pilot valve is arranged so that when moved in one direction from neutral position it connects the cylinder on one side of the piston to the source of fluid pressure and at the same time connects the cylinder on the other side of the piston to a region of lower pressure; and when moved in the other direction from neutral position, it connects the cylinder on the two sides of the piston in the opposite way. When the piston moves in either direction, it is necessary that it force the fluid on the one side of it out through the opening on such side of the piston and, as will be obvious, this requires a certain amount of power. In other words, the fluid on the discharge side of the piston offers a certain amount of counter-force which tends to retard the movement of the piston and thus render the regulation of the prime mover slow. The object of the present invention is to provide an improved structure in which such counter-force will be reduced to a minimum whereby the motor will be rendered more sensitive and hence adapted to produce quicker and closer regulation.

In carrying out my invention I provide a structure in which the cross-sectional area of discharge from the cylinder is always greater than the cross-sectional area of admission.

In the accompanying drawing Figures 1, 2, 3 and 4 are sectional diagrammatic views illustrating four different embodiments of my invention.

Referring first to Fig. 1, 5 indicates the cylinder and 6 the piston of a fluid motor. 7 is a rod through which the piston 6 is connected to a valve mechanism. This valve mechanism may be of any suitable type and may control the admission of motive fluid to any desired type of prime mover. In the present instance I have shown a valve $7^a$ controlling the admission of motive fluid to an elastic fluid turbine $7^b$. 8 and 9 are pipes leading to the cylinder on opposite sides of the piston 6 for conveying actuating fluid thereto, and 10 and 11 are pipes leading from the cylinder on opposite sides of the piston and through which operating fluid is discharged. They are provided with regulating valves $8^a$, $9^a$, $10^a$ and $11^a$ respectively. The pipes 8 and 9 are controlled by cylindrical valves 12 and 13 which are spaced apart and move in a valve casing 14. Connected to casing 14 between the two valves is the pipe 15 for the admission of motive fluid. The discharge pipes 10 and 11 are controlled by valves 16 and 17 which are connected respectively with the valves 12 and 13 and which move in valve casings 18 and 19. The valves 16 and 17 are of larger diameter than the valves 12 and 13, as will be clear from the drawing. Leading from the valve casings 18 and 19 are the discharge pipes 20 and 21 which may lead to atmosphere or other region of lower pressure. The valves 12, 13, 16 and 17 have a common stem 22 which projects on opposite sides of the valve casings. At the one end it is connected to the central portion of a floating lever 23 which lever is pivoted at one end on the valve stem 7 and has its other end connected with a governor 24, thus forming a usual and well known type of follow-up device.

In operation, if the governor moves the stem 22 downward the valve 13 will uncover the end of the pipe 9 so as to admit motive fluid to the under side of the piston 6, while the valve 16 will uncover the end of pipe 10 so that motive fluid may discharge through the pipe 10, casing 18 and pipe 20. If the governor moves the stem 22 in the opposite direction then the valve 12 uncovers the pipe 8 to admit motive fluid above the piston 6 and the valve 17 uncovers the end of the pipe 11 so that motive fluid may be discharged from the under side of the piston 6 through it to the discharge pipe 21. In this arrangement it will be noted that when the pipes 8 and 11 are uncovered the pipes 9 and 10 remain covered, while when the pipes 9 and 10 are uncovered the pipes 8 and 11 remain covered. In other words, there is provided a separate admission pipe and a separate discharge pipe for the cylinder on each side of the piston. As already pointed out, the object of the invention is to provide a structure in which the cross-sectional area of discharge from the cylinder is greater than the cross-sectional area of admission, and to this end the pipes 10 and 11 may be for example of greater cross-sectional area than the pipes 8 and 9, or, I may provide two or more of the pipes 10 and 11 on each side of the piston, arranged so that they will be simultaneously uncovered. The casings 18 and 19 in which the valves 16 and 17 move are preferably made larger than the casing 14 in order to provide for the additional area required for the discharge passage or passages. I can furthermore regulate the effective areas of pipes 8, 9, 10 and 11 by means of the valves 8ª, 9ª, 10ª, and 11ª.

Referring to Fig. 2 wherein I have shown a second form of my invention, 25 indicates the cylinder and 26 the piston of a fluid actuated motor having its rod 27 connected with the valve mechanism of a prime mover, for example as shown in Fig. 1. 28 indicates the usual and well known form of pilot valve for controlling such a motor, the same comprising a valve casing 29 and two valves 30 which cover and uncover respectively the ends of the pipes 31 and 32 leading to the cylinder 25 on opposite sides of the piston 26. 33 is a pipe through which motive fluid is lead to the pilot valve, and 34 and 35 are the discharge pipes. The stem 36 of the pivot valve is connected to floating lever 37 which in turn is connected to rod 27 and to a speed governor, as shown for example in Fig. 1. In this embodiment of my invention in order to provide greater discharge area, I provide in addition to that which is provided by the pipes 31 and 32 openings 38 and 39 controlled by the valves 40 and 41 respectively, which form auxiliary outlets or discharge passages. The valve 40 has its stem 42 connected to a piston 43 which moves in a cylinder 44, and the valve 41 has its stem 45 connected to a piston 46 which moves in a cylinder 47. The pipe 31 is connected by a branch pipe 48 to the outer side of piston 43 and is connected by a pipe 49 to the inner side of piston 46. The pipe 32 is connected by a pipe 50 to the inner side of piston 43, and by a pipe 51 to the outer side of piston 46. If now the pilot valves 30 are moved downwardly so as to admit motive fluid through pipe 32 to the under side of the piston 26, and at the same time permit it to discharge from the upper side of the piston 26 through pipe 31, it will be seen that the pipes 50 and 51 will be connected with the high pressure motive fluid, while the pipes 48 and 49 will be subjected to a lower pressure. This means that the pressure through the pipe 51 on the outer side of the piston 46 is greater than the pressure through the pipe 49 on the inner side of it, and it will, therefore, be held closed. At the same time the pressure on the inner side of the piston 43 through pipe 50 will be greater than the pressure on its outer side through pipe 48, and hence it will move to open the valve 40. This will uncover the opening 38 and thus provide additional area for the discharge of fluid from the upper side of the piston. A movement of the pilot valves in the opposite direction, as will be obvious, will produce the opposite result, the valve 40 being held closed and the valve 41 opened to provide additional discharge area from the under side of the piston.

In Fig. 3 I have illustrated a form of my invention which is similar to the arrangement shown in Fig. 2, but differs therefrom in that the auxiliary outlets here represented by pipes 60 and 61 are controlled by a valve 62 moving in a valve casing 63, the valve 62 being connected to the same stem as are the pilot valves 64. In this arrangement, as will be obvious, when the pilot valves 64 are moved in either direction to operate the motor the valve 62 will be moved along therewith so as to uncover either pipe 60 or 61 and thus provide additional area for the escape of motive fluid. Except as noted, I have applied to corresponding parts the same reference numerals as are used in Fig. 2.

In Fig. 4 I have shown a form of my invention in which the admission of motive fluid to the cylinder 70 on opposite sides of the piston 71 is controlled by a cylindrical valve 72 moving in a casing 73, while the discharge of motive fluid from the cylinder 70 is controlled by a valve 74 which moves in a valve casing 75, the two valves 72 and 74 being connected with a common stem 76. This arrangement is somewhat analogous to that shown in Fig. 1 (the operation being substantially the same) and the arrangement is such that the cross-sectional areas of the discharge pipes 77 are greater than that of the admission pipes 78. To this end the pipes 77 may, for example, be made larger than pipes 78, or there may be two or more of them, or they may be regulated by suitable valves 80, as already described in connection with Fig. 1. 81 indicates the rod which connects with the valve mechanism corresponding to rod 7 of Fig. 1, and 82 is a floating lever corresponding to lever 23 of Fig. 1. From the description already given it is believed that the operation of the arrangement shown in Fig. 4 will be obvious without further explanation. In this connection it will be noted that the pipes 77 are connected into cylinder 70 through openings located in the side wall thereof adjacent the ends so that as the piston 71 approaches the limit of its movement in either direction the openings are gradually covered. This has the advantage that the discharge of fluid will be gradually throttled as the piston approaches the end of its movement, and the movement of it will thus be retarded so that it will come to rest without shock. It will be understood that the arrangements of Figs. 1, 2 and 3 may be similar to this if found desirable so as to obtain the same result.

In accordance with the provisions of the patent statutes, I have described the principle of operation of my invention, together with the apparatus which I now consider to represent the best embodiments thereof; but I desire to have it understood that the apparatus shown is only illustrative, and that the invention can be carried out by other means.

What I claim as new and desire to secure by Letters Patent of the United States, is,

1. The combination in a fluid actuated motor, of a cylinder, a piston therein, a pilot valve, conduits controlled by the pilot valve for conveying actuating fluid to and from the cylinder on opposite sides of the piston, the conduits for conveying the fluid from the cylinder having a greater effective area than those for conveying it to the cylinder, and the conduits for conveying fluid from the cylinder being connected into it through the side wall adjacent the ends thereof so that the piston in the extremes of its movement will cover such conduits.

2. The combination with the prime mover having valve mechanism for controlling the admission of motive fluid thereto, and a governor responsive to the load thereon, of a fluid actuated motor having a cylinder, and piston therein, means connecting the piston to the valve mechanism, a pilot valve, conduits connecting the casing of the pilot valve to said cylinder on opposite sides of the piston, said pilot valve controlling the admissions and discharge of fluid through said conduits to and from the cylinder, and said pilot valve when actuated providing a larger area for the discharge of fluid than for the admission thereof, and means connecting the governor to the pilot valve.

3. The combination with a prime mover having a valve mechanism for controlling the admission of motive fluid thereto, and a governor responsive to the load thereon, of a fluid actuated motor having a cylinder, a piston therein, means connecting the piston to the valve mechanism, a pilot valve, conduits connecting the casing of the pilot valve to the cylinder, said conduits being adapted to be connected to a source of fluid pressure, and conduit means also controlled by the pilot valve for providing an area for the discharge of fluid from said cylinder which is greater than the area provided for the admission of fluid.

4. The combination with a prime mover having a valve mechanism for controlling the admission of motive fluid thereto, and a governor responsive to the load thereon, of a fluid actuated motor having a cylinder, a piston therein, a rod connecting the piston to the valve mechanism, a pilot valve, conduits connecting the casing of the pilot valve to the cylinder for conveying actuating fluid to and from the cylinder on opposite sides of the piston, the conduits for conveying the fluid from the cylinder having a greater effective area than those for conveying it to the cylinder, said pilot valve controlling the admission and discharge of fluid to and from said conduits, and means connecting the governor to said pilot valve.

5. The combination with a prime mover having a valve mechanism for controlling the admission of motive fluid thereto, and a governor responsive to the load thereon, of a fluid actuated motor having a cylinder, a piston therein, a rod connecting the piston to the valve mechanism, a pilot valve, conduits connecting the casing of the pilot valve to the cylinder for conveying actuating fluid to and from the cylinder on opposite sides of the pistons, the conduits for conveying the fluid from the cylinder having a greater effective area than those for conveying it to the cylinder, said pilot valve controlling the admission and discharge of fluid to and from said conduits, and means including a follow-up device for connecting the governor to the pilot valve.

6. In a valve mechanism, the combination of valve means arranged to regulate the admission of fluid to a prime mover, a fluid motor for moving the valve means, a pilot valve and its casing, inlet conduits connecting the valve casing with the cylinder of the motor on opposite sides of its piston, discharge conduits for the motor cylinder having greater cross-sectional areas than the inlet conduits, means for opening the discharge conduit on the opposite side of the piston from that subjected to pressure from the pilot valve, said means operating substantially simultaneously with the pilot valve, and a means for moving the pilot valve.

7. In a valve mechanism, the combination of a valve means arranged to regulate the supply of fluid to a consumption device, a fluid motor for moving the valve means, a pilot valve and its casing, inlet conduits connecting the valve casing with the cylinder of the motor on opposite sides of the piston, discharge conduits for the motor cylinder having greater cross-sectional areas than the inlet conduits, valves controlling the discharge conduits, means for actuating the last named valves simultaneously with the pilot valve, and a speed governor for actuating the pilot valve.

8. In an apparatus of the character described, the combination of a cylinder, a piston therein, a conduit connected to the cylinder on each side of the piston, a source of fluid pressure, a pilot valve which serves to connect the conduit on one side of the piston to said source of fluid pressure and the conduit on the other side of the piston to a region of lower pressure, and conduit means controlled by the pilot valve for providing additional discharge area from the cylinder on either side of said piston whenever the conduit leading from such side is connected by said pilot valve to a region of lower pressure.

In witness whereof, I have hereunto set my hand this twenty-first day of January, 1916.

Dr. PAUL EMDEN.